United States Patent Office 3,527,695
Patented Sept. 8, 1970

3,527,695
HYDROGENATION OF AROMATICS
Paul Anthony Lawrance, Stanwell, and Bernard Whiting Burbidge, Leatherhead, England, assignors to The British Petroleum Company Limited, London, England, a corporation of Great Britain
No Drawing. Filed Mar. 12, 1968, Ser. No. 712,387
Claims priority, application Great Britain, Mar. 23, 1967, 13,652/67; Aug. 24, 1967, 38,981/67
Int. Cl. C07c 5/10; C10g 23/02
U.S. Cl. 208—143                    8 Claims

ABSTRACT OF THE DISCLOSURE

Aromatics are hydrogenated in the presence of 0.1–1000 p.p.m. of sulphur at 90–400° C. over a catalyst of palladium incorporated with a zeolite with pore openings of at least 6 A. Simultaneous desulphurisation may also occur, but there are desirably no other reactions (e.g. no isomerisation or hydrocracking). The other process conditions may be 0-3000 p.s.i.g., 0.1–20 v./v./hr. and 0.1–20:1 $H_2$:HC molar ratio. The preferred zeolite is decationised zeolite Y.

The process may be a pretreatment stage for a low temperature isomerisation process using a catalyst of platinum-alumina chlorinated with a chlorine derivative of methane containing at least 2 Cl atoms. The feedstock may contain $C_5$–$C_6$ paraffin hydrocarbons and up to 5% wt. aromatics which are hydrogenated in the pretreatment stage.

This invention relates to the hydrogenation of aromatics in the presence of sulphur.

It is well known that the platinum group metals are good hydrogenation catalysts but that their activity for the hydrogenation of aromatics tends to be impaired by the presence of sulphur compounds, which sulphide the metal surface. It has now been found that the degree of tolerance to sulphur varies considerably as between platinum and palladium. For example in a process for the hydrogenation of a small amount (up to 5% wt.) of benzene in a $C_5$–$C_6$ paraffinic hydrocarbon fraction containing also 1 to 3 p.p.m. of sulphur a platinum-alumina catalyst maintains its activity over a long period of time (at least 6000 hours). On the other hand, although a palladium-alumina catalyst has initially good hydrogenation activity, this activity quickly drops off, so that after less than 200 hours on stream the catalyst is inactive. Since palladium is a good deal cheaper than platinum there is a strong incentive to use it in preference to platinum if possible. Thus a method of overcoming the rapid poisoning of palladium is particularly desirable.

It has now been found that the aromatic hydrogenation activity of palladium catalysts can be maintained in the presence of sulphur by using a catalyst comprising palladium and a zeolite. It has also been found that appreciable desulphurisation can also be achieved.

According to the present invention, therefore, a process for the hydrogenation of aromatics in the presence of from 0.1 to 1000 p.p.m. of sulphur by weight of feedstock comprises contacting an aromatic-containing feedstock at a temperature of from 90 to 400° C. and in the presence of hydrogen with a catalyst comprising palladium incorporated with a crystalline zeolite having pore openings of at least 6 A.

It has previously been proposed to use zeolites incorporating a hydrogenation component as catalysts for a variety of reactions, for example isomerisation, and hydrocracking. In the present invention, hydrogenation is preferably the sole reaction, without additional or side reactions, such as isomerisation and hydrocracking catalysed by the zeolite itself. This may be achieved, for example, by using low temperatures and/or high space velocities sufficient for hydrogenation but insufficient for other zeolite-catalysed reactions. Alternatively the zeolite may be one which has a low activity in itself, for example on alkali metal zeolite.

Examples of suitable zeolites are zeolite Y or faujasite, which is the preferred zeolite, mordenite and zeolite X; other known zeolites may also be suitable. As stated above the zeolites should have pore openings of at least 6 A. so that the aromatics can enter the zeolite itself. In practice the upper limit of pore size of zeolites is 15 A.

Preferably the palladium is incorporated into the zeolite as a cation by ion-exchange in known manner and it may form from 0.01 to 10% wt., preferably 0.1 to 5% wt. of the zeolite. Where the amount of palladium is less than the total cation capacity of the zeolite, the remaining capacity may be cations of other metals, known to be capable of inclusion in the zeolite crystal structure, or the zeolite, may be in the "decationised" form. The term "decationised" as used in connection with zeolites means a zeolite deficient in metal cations. Preferably the zeolite contains less than 2% wt. more particularly less than 1% wt. of metal cation other than palladium. A convenient method of decationisation is to contact the zeolite with a solution containing ammonium ions to replace metal cations by ammonium ions and then to heat the ammonium form to drive off ammonia. It is assumed that hydrogen cations remain and sometimes decationised zeolites are referred to as hydrogen zeolites. The exact structure of decationised zeolites is, however, uncertain. Decationised zeolites can also be prepared from certain zeolites by contacting the metal cation containing zeolite with a mineral acid, for example hydrochloric or sulphuric acid.

When a decationised zeolite is used the palladium is preferably added after decationisation. In the case of decationisation by ammonium exchange and heating, the metal may also be added between the ammonium exchange and the heating.

Preferably the zeolite containing the palladium is heated in a reducing atmosphere before use for example it may be heated to from 250 to 500° C. for from 1 to 10 hours in a stream of hydrogen.

The aromatic-containing feedstock may be from any convenient source but it is preferably a petroleum fraction.

Preferred feedstocks are those boiling within the range 30–250° C. The aromatic content of the feedstock may vary from 0.001 to 100% wt. depending on the purpose of the hydrogenation. Thus one use of the process is the hydrogenation of a feedstock containing at least 95% wt. of aromatics to the corresponding naphthenes, particularly the hydrogenation of a feedstock containing at least 95% wt. of benzene to cyclohexane.

Preferably however the aromatics are admixed with other hydrocarbons. These other hydrocarbons may include unsaturated hydrocarbons such as olefins and acetylenes in which case these hydrocarbons will also be hydrogenated. The other hydrocarbons may also be saturated hydrocarbons particularly acyclic and/or cyclo paraffins. Thus one particular application of the present invention is a process for the hydrogenation of aromatics in a feedstock boiling below 204° C. and consisting of paraffin hydrocarbons, from 0.001 to 5% wt. of aromatics and from 0.1 to 1000 p.p.m. of sulphur by weight of feedstock at a temperature of from 90 to 400° C. and in the presence of hydrogen with a catalyst comprising palladium incorporated with a crystalline zeolite having pore openings of at least 6 A., hydrogenation of the aromatics being substantially the only reaction occurring and the paraffins remaining substantially unchanged.

Preferably the feedstock boils within the range 35 to 120° C. and consists of $C_5$ and/or $C_6$ paraffins and benzene and/or toluene.

It is well known that quite small quantities of sulphur are sufficient to poison the aromatic hydrogenation activity of Group VIII metal catalysts. With the catalyst of the present invention, however, not only is the catalyst not poisoned by sulphur, but it can also achieve appreciable desulphurisation. As stated above, the sulphur content of the feedstock may thus be from 0.1 up to about 1000 p.p.m. of sulphur by weight. The presence of sulphur does, however, tend to reduce the activity of the catalyst, so that more severe conditions (e.g. a higher temperature and/or lower space velocity) may be necessary with the higher sulphur content feeds. For maximum hydrogenation activity, the sulphur content of the feedstock is desirably 0.1–10 p.p.m.

The type of sulphur compound present is not critical and the present invention can be used with any sulphur compounds, including thiophenes. Since thiophenes are the most difficult sulphur compounds to remove from hydrocarbon fractions and are liable to persist in small amounts even when the feedstock has been given a conventional hydrocatalytic desulphurisation, it is particularly useful to have a catalyst and process capable of combating the adverse effects of thiophenic sulphur.

The process conditions for the hydrogenation will depend on the feedstock, the amount of sulphur present and the extent of aromatic hydrogenation required, but they may be chosen from the following ranges:

|  | Broad range | Preferred range |
| --- | --- | --- |
| Temperature, °C | ¹ 90–400 | 90, 300 |
| Pressure, p.s.i.g | 0–3,000 | 50–1,000 |
| Space velocity, v./v./hr | 0.1–20 | 5–20 |
| $H_2$: HC mole ratio | 0.1: 1–20: 1 | 0.5–5 |

¹ As stated above.

The preferred feedstocks boiling below 204° C. and consisting of paraffins, aromatics and sulphur are suitable feedstocks for a low temperature paraffin isomerisation process as described and claimed in U.K. Pats. Nos. 953,188 and 953,189. The aromatics hydrogenation step according to the present invention may thus be a pretreatment stage of an isomerisation process. Thus the present invention includes a process for the isomerisation of paraffin hydrocarbons boiling below 204° C. comprising hydrogenating aromatics in a feed stock boiling below 204° C. and consisting of paraffin hydrocarbons, from 0.001 to 5% wt. of aromatics and from 0.1 to 1000 p.p.m. of sulphur by weight of feedstock at a temperature of from 90 to 400° C. and in the presence of hydrogen with a catalyst comprising palladium incorporated with a crystalline zeolite having pore openings of at least 6 A., hydrogenation of the aromatics being substantially the only reaction occurring and the paraffins remaining substantially unchanged and then isomerising the paraffins at a temperature below 204° C. and in the presence of hydrogen with a catalyst prepared by contacting a hydrogen-containing alumina with a compound of general formula

(where X and Y may be the same or different and selected from H, Cl, Br, F, or SCl, or where X and Y together may be O or S) under nonreducing conditions and at a temperature of from 149–593° C. such that chlorine is taken up by the alumina without the production of free aluminum chloride.

The preferred chlorinating agents coming within the general formula given above are methylene chloride ($CH_2Cl_2$), chloroform ($CHCl_3$) and, particularly, carbon tetrachloride ($CCl_4$).

Preferably the isomerisation catalyst contains a minor proportion of a metal or metal compound having hydrogenating activity selected from Groups VIa or VIII of the Periodic Table, particularly from 0.01 to 5% wt. of a platinum group metal, which is preferably platinum or palladium.

Desirably the isomerisation catalyst contains from $2.0 \times 10^{-4}$ to $3.5 \times 10^{-4}$ g. of chlorine/sq. metre of surface area. The isomerisation process conditions may be chosen from

|  | Broad range | Preferred range |
| --- | --- | --- |
| Temperature, °F | 50–400 | 150–350 |
| Temperature, °C | 10–204 | 65–177 |
| Pressure, p.s.i.g | 0–2,000 | 225–1,000 |
| Pressure, kg./cm.² | 1–141 | 17–71 |
| Space velocity, v./v./hr | 0.05–10 | 0.2–5 |
| $H_2$: Hydrocarbon mole ratio | 0.01–20: 1 | 1.5–15: 1 |

To increase and sustain the activity of the isomerisation catalyst the isomerisation may take place in the presence of from 0.01 to 5% wt. of chlorine by weight of feedstock added as hydrogen chloride or a compound decomposable to hydrogen chloride under the isomerisation conditions, e.g. carbon tetrachloride.

The invention is illustrated by the following comparative examples.

Example 1

A catalyst of palladium on a decationised zeolite Y having the following composition Pd, percent weight _____ 0.52
Si, percent weight _____ 33.1
Al, percent weight _____ 13.4
Na, percent weight _____ 0.94
Surface area, m.²/g _____ 676
Pore volume _____ 0.33 was reduced in hydrogen at 260° C. (500° F.) for 4 hours and was then used to hydrogenate benzene in a feedstock having a boiling range of 45 to 67° C. and the following composition:

$C_5$ acyclic paraffins—47% wt.
$C_6$ acyclic paraffins—47% wt.
Benzene—0.8% wt. (8000 p.p.m.)
Naphthenes and $C_7$ acyclic paraffins—balance
Sulphur—1.5 p.p.m. by weight Once-through hydrogen was used at 350 p.s.i.g. The other process conditions used and the results obtained are set out in Table 1 below.

TABLE 1

| H.O.S. | Conditions Temperature °C. | °F. | L.H.S.V., vol./vol./h. | H₂:HC mol ratio | Product benzene (average), p.p.m. | Hydrogenation, percent |
|---|---|---|---|---|---|---|
| 0–289 | 260 | 500 | 4 | 2.5:1 | 1 | 100 |
| 289–359 | 260 | 500 | 6 | 1.7:1 | 4 | 99.95 |
| 359–383 | 260 | 500 | 8 | 1.3:1 | 25 | 99.69 |
| 383–413 | 260 | 500 | 8 | 2.6:1 | 4 | 99.95 |
| 413–463 | 204 | 400 | 6 | 1.7:1 | 15 | 99.81 |
| 463–478 | 204 | 400 | 8 | 2.6:1 | 10 | 99.88 |
| 478–502 | 150 | 300 | 8 | 2.6:1 | 1,500 | 81.25 |
| 502–544 | 177 | 350 | 8 | 2.6:1 | 285 | 96.44 |

It will be seen that a high level of hydrogenation was achieved over a period of 500 hours. Temperature, space velocity and H₂:HC mole ratio were deliberately varied during the run to assess their effect on the extent of hydrogenation. The higher product benzene figure towards the end of the run do not, therefore, imply any catalyst deactivation.

At 544 hours stream toluene and C₈ aromatics were added to the feedstock as well as benzene and the results obtained are shown in Table 2 below.

TABLE 2

| | Conditions | | | | Product Aromatics, p.p.m. | | | Xylenes | | |
|---|---|---|---|---|---|---|---|---|---|---|
| H.O.S. | Temperature °C. | °F. | L.H.S.V., vol./vol./h. | H₂:HC mol ratio | Benzene | Toluene | Et. Benz. | Para | meta | Ortho |
| Feed | | | | | 11,000 | 15,000 | 3,000 | 1,000 | 8,000 | 1,000 |
| 545–571 | 177 | 350 | 8 | 2.6:1 | 4,500 | 5,500 | 760 | 400 | 2,300 | 150 |
| 571–589 | 204 | 400 | 8 | 2.6:1 | 850 | 900 | 90 | 25 | 300 | Nil |
| 589–604 | 232 | 450 | 8 | 2.6:1 | 60 | 60 | Nil | Nil | Nil | Nil |

This part of the run showed the ability of the catalyst to remove C₇ and C₈ aromatics.

At 604 H.O.S. the catalyst was still not deactivated and the catalyst life expressed in barrels of feedstock/lb. of catalyst was 17½.

Product from the period 383–413 H.O.S. (Table 1) was passed over a 0.57 percent weight platinum on alumina catalyst, which had been chlorinated with carbon tetrachloride in a non-reducing atmosphere at 500° F. to give a platinum-alumina-chlorine catalyst containing 12 percent weight chlorine, under the following conditions:

Pressure, p.s.i.g. _____ 250
Temperature, °F. _____ 270
LHSV, v./v./h. _____ 1
H₂:HC mol ratio _____ 2.5:1

Analyses of the feed, hydrogenated feed and the product after isomerisation over the platinum-alumina-chlorine catalyst are given below:

| | Feed, percent wt. | Hydrogenated feed, percent wt. | Isomerized product, percent wt. |
|---|---|---|---|
| n-Butane | 0.6 | 0.5 | 1.0 |
| Isopentane | 14.2 | 14.0 | 31.5 |
| n-Pentane | 32.1 | 32.0 | 15.0 |
| 2,2-dimethylbutane | 0.4 | 0.5 | 13.0 |
| 2,3-dimethylbutane | 2.1 | 1.7 | 5.5 |
| Cyclopentane | 1.7 | 1.7 | 2.0 |
| 2-methylpentane | 12.4 | 12.9 | 14.5 |
| 3-methylpentane | 9.8 | 9.8 | 8.0 |
| n-Hexane | 22.5 | 22.3 | 5.5 |
| Methylcyclopentane | 2.9 | 3.1 | 2.0 |
| 2,2-dimethylpentane | 0.1 | 0.1 | |
| Benzene | 0.8 | | |
| Cyclohexane | 0.4 | 1.4 | 2.0 |

EXAMPLE 2

This comparative example shows the results obtained with a catalyst of 0.6% wt. palladium on a predominantly eta-alumina support. Two runs were carried out, one with an unreduced portion of the catalyst reduced at 482° C. (900° F.) in hydrogen for 5 hours.

The feedstock was the same as that of Example 1 except that it contained rather less benzene—0.6% wt. (6000 p.p.m.)—and less sulphur—1 p.p.m. by weight.

The process conditions used were:

Temperature—260° C. (500° F.)
Pressure—350 p.s.i.g.
Space velocity—4.0 v./v./hr.
H₂:HC mole ratio—2.5:1

Both catalysts had a high initial activity. However the activity declined rapidly as shown in the following Table 3.

TABLE 3

| | Product benzene, p.p.m. | |
|---|---|---|
| Hours on stream: | Pre-reduced catalyst | Non-pre-reduced catalyst |
| 10 | 470 | 2 |
| 30 | 1,500 | 1 |
| 50 | (¹) | 2 |
| 70 | | 9 |
| 90 | | 36 |
| 110 | | 75 |
| 130 | | 240 |
| 150 | | 1,120 |

¹ Run terminated.

EXAMPLE 3

This example shows the hydrogenation of aromatics in the presence of substantial amounts of sulphur.

The catalyst used was the catalyst of Example 1 and the feedstock was an undesulphurised straight-run light gasoline having a boiling range of C₅ to 105° C. and containing Percent wt.
Benzene (7000 p.p.m.) _____ 0.7
Toluene (2500 p.p.m.) _____ 0.25
Sulphur (140 p.p.m.) _____ 0.014

This feedstock was hydrogenated at a pressure of 350 p.s.i.g. and a H₂:HC mole ratio of 2.5:1. Temperature and space velocity were adjusted to assess the effect of these variables on hydrogenation and desulphurisation. At 183 hours on stream the feedstock was changed to the desulphurised feedstock of Example 1. The temperatures and space velocities used and the results obtained are set out in Table 4 below.

TABLE 4

| | Undesulphurised feedstock | | | | | | Desulphurised feedstock |
|---|---|---|---|---|---|---|---|
| Hours on stream | 0–42 | 42–65 | 65–84 | 84–117 | 117–139 | 139–183 | 183–287 |
| Temperature, °C | 260 | 275 | 290 | 305 | 320 | 305 | 260 |
| Space velocity, v./v./hr | 4 | 4 | 4 | 4 | 4 | 2 | 8 |
| Product, p.p.m.: | | | | | | | |
| Benzene | 600–800 | 400–600 | 350 | 210 | 150 | 40 | 1 |
| Toluene | 50–90 | 30–40 | 30 | 80 | 80 | 40 | |
| Sulphur | 5–6 | 1–3 | 0.3 | 0.1 | 0.1 | 0.1 | 0.2 |

The table shows that at 260° C. and 4 v./v./hr. about 90% of the benzene and 96–98% of the toluene were hydrogenated and the sulphur removal was about 97%. By increasing the temperature to 305° C. and dropping the space velocity to 2, the extent of benzene hydrogenation was increased to 99.5% and the desulphurisation was almost complete. On changing to a sulphur-free feedstock there was almost complete hydrogenation of both benzene and toluene, indicating that although the sulphur in the feedstock had depressed the catalyst activity in the period up to 183 hours on stream it had had no permanent effect.

The yield of normally liquid product having the same boiling range on the feedstock was >99% wt. and the analysis of the individual hydrocarbons in the feed and product was

|   | Feed, percent wt. | Product at 90 H.O.S. (See Table 4), percent wt. |
|---|---|---|
| Propane | | 0.3 |
| Isobutane | 0.2 | 1.0 |
| n-Butane | 7.6 | 6.5 |
| Isopentane | 15.9 | 15.7 |
| n-Pentane | 27.4 | 26.4 |
| 2,2-dimethyl butane | 0.3 | 0.4 |
| Cyclopentane | 1.1 | 1.2 |
| 2,3-dimethyl butane | 1.4 | 2.2 |
| 2-methyl pentane | 9.4 | 10.7 |
| 3-methyl pentane | 7.3 | 7.4 |
| n-Hexane | 17.8 | 17.8 |
| Methylcyclopentane | 2.8 | 3.5 |
| 2,2-dimethyl pentane | Trace | Trace |
| Benzene | 0.8 | Trace |
| 2,4-dimethyl pentane | 0.3 | 0.1 |
| Cyclohexane | 1.1 | 1.2 |
| 2-methyl hexane | 1.4 | 1.2 |
| 2,3-dimethyl pentane | 0.4 | 0.2 |
| 3-methyl hexane | 1.7 | 1.5 |
| 3-ethyl pentane | 0.2 | 0.1 |
| n-Heptane | 2.4 | 2.1 |
| Methyl cyclohexane | 0.2 | 0.5 |
| Toluene | 0.3 | |

Thus there was no cracking or isomerization of the feedstock and hydrogenation of the aromatics was the only reaction occurring in addition to desulphurization.

We claim:

1. A process for the hydrogenation of aromatics in a hydrocarbon feedstock boiling within the range 35 to 120° C. which feedstock comprises paraffin hydrocarbon as the major part of the feedstock, from 0.001 to 5% wt. of aromatics and from 0.1 to 1000 p.p.m. of sulphur by weight of feedstock, which process comprises contacting the feedstock in a reaction zone with a catalyst consisting essentially of palladium incorporated with a crystalline zeolite having pore openings of at least 6 A. at a temperature in the range 90 to 400° C., and in contact wtih added hydrogen whereby hydrogenation of the aromatics is substantially the only reaction occurring, and the paraffins will remain substantially unchanged.

2. A process as claimed in claim 1 wherein the zeolite is zeolite Y.

3. A process as claimed in claim 1 wherein the palladium is incorporated into the zeolite by ion exchange and it forms from 0.01 to 10% wt. of the zeolite.

4. A process as claimed in claim 1 wherein the zeolite is in the decationised form.

5. A process as claimed in claim 1 wherein the feedstock boils within the range 40 to 75° C., wherein the paraffins are selected from the group consisting of $C_5$ paraffins, $C_6$ paraffins, and mixtures thereof, and the aromatics are selected from the group consisting of benzene, toluene, and mixtures thereof.

6. A process as claimed in claim 1 wherein the weight of sulphur present is from 0.1 to 10 p.p.m.

7. A process as claimed in claim 1 wherein the pressure is from 0 to 3000 p.s.i.g., the space velocity is from 0.1 to 20 v./v./h. and the hydrogen:hydrocarbon mole ratio is from 0.1:1–20:1.

8. A process as claimed in claim 7 wherein the temperature is from 90–300° C., the pressure is from 50–1000 p.s.i.g., the space velocity is from 5–20 v./v./h. and the hydrogen:hydrocarbon mole ratio is from 0.5–5.

References Cited

UNITED STATES PATENTS

| 3,197,398 | 7/1965 | Young | 260—667 |
| 3,201,356 | 8/1965 | Kress | 260—676 |

DELBERT E. GANTZ, Primary Examiner

V. O'KEEFE, Assistant Examiner

U.S. Cl. X.R.

260—667

UNITED STATES PATENT OFFICE
CERTIFICATE OF CORRECTION

Patent No. 3,527,695　　　　Dated September 8, 1970

Inventor(s) Paul Anthony Lawrance and Bernard Whiting Burbidge

It is certified that error appears in the above-identified patent and that said Letters Patent are hereby corrected as shown below:

Col. 3, line 53, under column headed "Preferred Range", for "90.300" read --90-300--;

Col. 3, line 75, for "e A" read --6 A --; and

Col. 7, line 45, for "hydrocarbon" read --hydrocarbons--.

SIGNED AND SEALED
FEB 23 1971

Edward M. Fletcher, Jr.
Attesting Officer

WILLIAM E. SCHUYLER, JR
Commissioner of Patents